(12) United States Patent
Arenz et al.

(10) Patent No.: US 10,895,876 B2
(45) Date of Patent: Jan. 19, 2021

(54) METHOD FOR DETERMINING A SPECIFIC CONTROL PARAMETER RANGE OF AN AUTONOMOUS MOBILE GREEN AREA MAINTENANCE ROBOT, METHOD FOR OPERATING AN AUTONOMOUS MOBILE GREEN AREA MAINTENANCE ROBOT, SYSTEM AND AUTONOMOUS MOBILE GREEN AREA MAINTENANCE ROBOT

(71) Applicant: Andreas Stihl AG & Co. KG, Waiblingen (DE)

(72) Inventors: Martin Christoph Arenz, Stuttgart (DE); Christoph Schoepf, Langkampfen (AT); Andreas Strohmaier, Weissach (DE); Samuel Zoettl, Birgitz (AT)

(73) Assignee: Andreas Stihl AG & Co. KG, Waiblingen (DE)

(*) Notice: Subject to any disclaimer, the term of this patent is extended or adjusted under 35 U.S.C. 154(b) by 126 days.

(21) Appl. No.: 16/003,839

(22) Filed: Jun. 8, 2018

(65) Prior Publication Data
US 2018/0356829 A1    Dec. 13, 2018

(30) Foreign Application Priority Data
Jun. 9, 2017 (EP) .................................. 17175385

(51) Int. Cl.
*G05D 1/02* (2020.01)
*A01D 34/00* (2006.01)
*G05D 1/00* (2006.01)

(52) U.S. Cl.
CPC ......... *G05D 1/0219* (2013.01); *A01D 34/008* (2013.01); *G05D 1/0088* (2013.01);
(Continued)

(58) Field of Classification Search
CPC .. A01D 34/008; G05D 1/0088; G05D 1/0216; G05D 1/0227; G05D 1/0376;
(Continued)

(56) References Cited

U.S. PATENT DOCUMENTS

2007/0276558 A1* 11/2007 Kim ..................... G05D 1/0236
701/23
2012/0063269 A1* 3/2012 Chung .................... G01S 15/10
367/118
(Continued)

FOREIGN PATENT DOCUMENTS

CN         103217977 A      7/2013
DE    10 2015 119 501 A1   5/2017
(Continued)

OTHER PUBLICATIONS

Ejkreinar, "Random-Moving Lawnmower Robots", CWRN Cutter Clues, pp. 1-5, Nov. 30, 2012.

*Primary Examiner* — Rachid Bendidi
(74) *Attorney, Agent, or Firm* — Crowell & Moring LLP

(57) ABSTRACT

A method determines a specific control parameter range of an autonomous mobile green area maintenance robot for an area to be treated having a specific shape and a specific size. A method operates an autonomous mobile green area maintenance robot on an area to be treated having a specific shape and a specific size using such a method. A system, in particular for carrying out such a method, and an autonomous mobile green area maintenance robot, are provided.

11 Claims, 1 Drawing Sheet

(52) U.S. Cl.
CPC ......... G05D 1/0227 (2013.01); G05D 1/0276 (2013.01); G05D 1/0285 (2013.01); G05D 2201/0201 (2013.01); G05D 2201/0208 (2013.01)

(58) Field of Classification Search
CPC ......... G05D 1/0285; G05D 2201/0208; G05D 2201/0201
See application file for complete search history.

(56) References Cited

U.S. PATENT DOCUMENTS

| | | | | |
|---|---|---|---|---|
| 2012/0226381 | A1* | 9/2012 | Abramson | A01D 34/008 700/255 |
| 2014/0324246 | A1* | 10/2014 | Biber | G05B 13/0205 700/302 |
| 2016/0129593 | A1* | 5/2016 | Wolowelsky | B25J 9/163 700/253 |
| 2019/0025838 | A1* | 1/2019 | Artes | G05D 1/0219 |

FOREIGN PATENT DOCUMENTS

| | | |
|---|---|---|
| EP | 1 898 289 A2 | 3/2008 |
| EP | 1 933 467 A2 | 6/2008 |
| WO | WO 2016/108095 A1 | 7/2016 |

\* cited by examiner

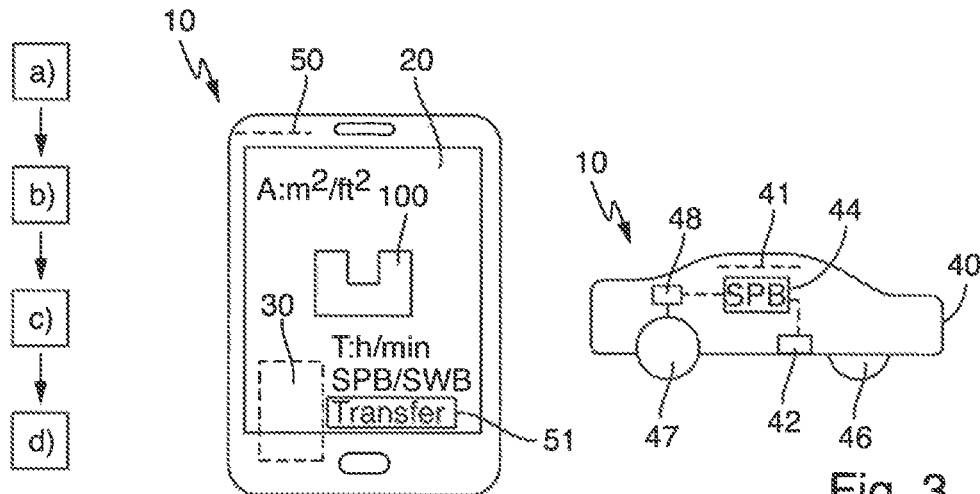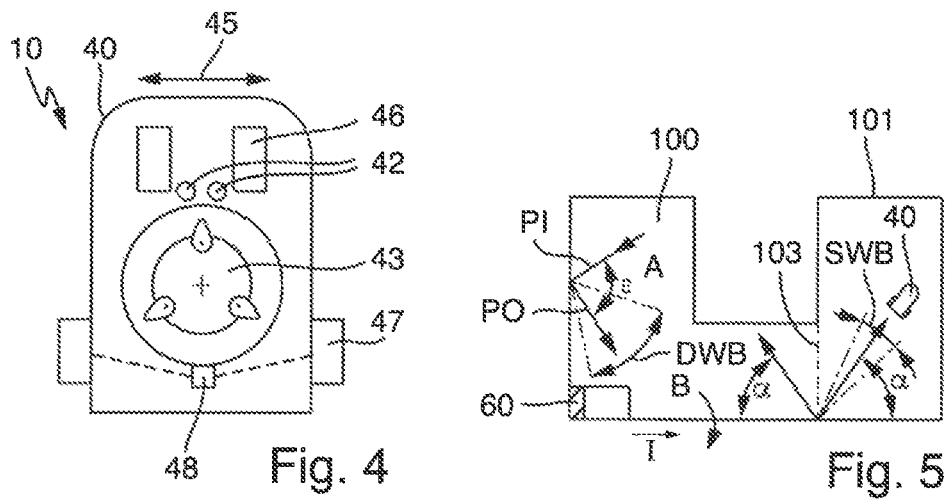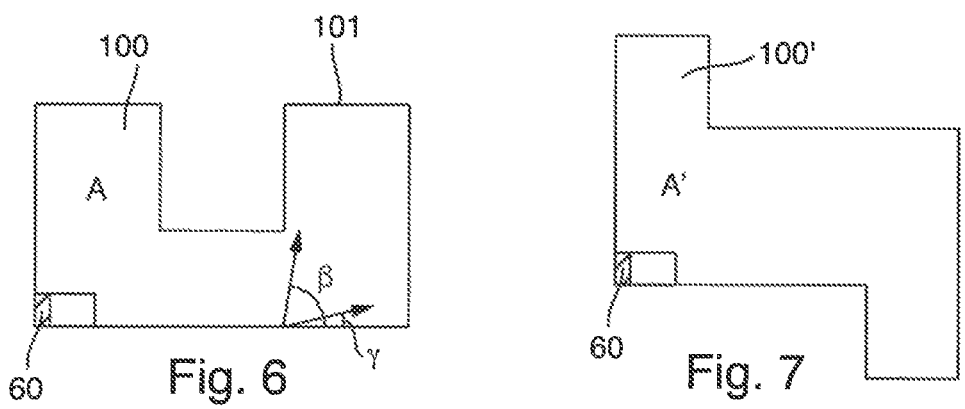

METHOD FOR DETERMINING A SPECIFIC CONTROL PARAMETER RANGE OF AN AUTONOMOUS MOBILE GREEN AREA MAINTENANCE ROBOT, METHOD FOR OPERATING AN AUTONOMOUS MOBILE GREEN AREA MAINTENANCE ROBOT, SYSTEM AND AUTONOMOUS MOBILE GREEN AREA MAINTENANCE ROBOT

CROSS REFERENCE TO RELATED APPLICATION

This application claims priority under 35 U.S.C. § 119 from European Patent Application No. 17 175 385.8, filed Jun. 9, 2017, the entire disclosure of which is herein expressly incorporated by reference.

BACKGROUND AND SUMMARY OF THE INVENTION

The invention relates to a method for determining a specific control parameter range of an autonomous mobile green area maintenance robot for an area to be treated having a specific shape and a specific size, a method for operating an autonomous mobile green area maintenance robot on an area to be treated having a specific shape and a specific size using such a method, a system, in particular for carrying out such a method, and an autonomous mobile green area maintenance robot.

An autonomous mobile lawn mower robot and a method for operating same are known.

The invention is based on the object of providing a method for an autonomous mobile green area maintenance robot, which method makes it possible to improve the treatment of an area to be treated by means of the autonomous mobile green area maintenance robot. The invention is also based on the object of providing a method for operating an autonomous mobile green area maintenance robot on an area to be treated, a system, in particular for carrying out the method, and an autonomous mobile green area maintenance robot.

The invention achieves this object by providing methods, a system and a robot in accordance with claimed embodiments of the invention. Advantageous developments and/or configurations of the invention are described and claimed herein.

The method according to the invention for determining a specific control parameter range of an autonomous mobile green area maintenance robot for an area to be treated having a specific shape and a specific size, wherein the autonomous mobile green area maintenance robot is configured to control its movement, in particular its direction of movement, on the area to be treated as a function of the specific control parameter range, comprises the following steps: a) predefining the specific shape and the specific size of the area to be treated, and b) determining and/or identifying, in particular automatically determining, the specific control parameter range as a function of the predefined specific shape and the predefined specific size of the area to be treated.

The method makes it possible to determine the specific control parameter range for the area to be treated having the specific shape and the specific size. An improved, in particular a more efficient and/or more effective, autonomous treatment of the area to be treated can thus be made possible using the autonomous mobile green area maintenance robot, in particular a specific treatment adapted to the area to be treated.

The area to be treated can be, for example, an open space, in particular an area of unsealed ground, or a green space, such as a meadow with grass. The specific shape can be, for example, a rectangular shape, a U shape or an S shape. The specific size can be, for example, in a range of less than 500 meters square (m$^2$) up to 4000 m$^2$. The area to be treated having the specific shape and the specific size can advantageously be a specific garden of a specific user and/or customer.

The specific control parameter range can have a frequency distribution, which can be used to select a specific control parameter value from an, in particular allowed, control parameter range, in particular by means of a random algorithm. In addition or alternatively, the specific control parameter range can have a specific time range in which the green area maintenance robot can move in one direction and after which it can change its direction.

The predefinition in step a) can take place at least partly, in particular completely, automatically. Advantageously, predefinition of an address, in particular of the user, can precede step a), wherein, in step a), the specific shape and the specific size of the area to be treated can be determined automatically as a function of the address and can be predetermined for step b). This can advantageously take place using a map service, in particular an Internet-based map service. Step b) can advantageously be carried out temporally after step a). The method can be carried out at and/or by a manufacturer and/or specialist dealer for autonomous mobile green area maintenance robots.

In one development of the invention, step b) comprises: selecting the specific control parameter range from an allowed control parameter range. In particular, the specific control parameter range can be relatively smaller than the allowed relatively larger control parameter range. The specific control parameter range can advantageously comprise or be a continuous control parameter range.

In one development of the invention, the specific control parameter range includes a specific departure angle range and/or a specific rotation angle range. The area to be treated having the specific shape and the specific size is enclosed by a boundary. The autonomous mobile green area maintenance robot is configured to control its movement away from the boundary at an angle of the specific departure angle range. In addition or alternatively, the autonomous mobile green area maintenance robot is configured to control a rotation of its direction of movement on the boundary at a rotation angle of the specific rotation angle range. Step b) comprises: determining the specific departure angle range and/or the specific rotation angle range as a function of the predefined specific shape and the predefined specific size of the area to be treated. In particular, the area to be treated does not yet need to be enclosed by the boundary when the method is carried out. The boundary can up to this point be just planned and/or intended. It may be sufficient in terms of time when the area can be enclosed by the boundary during autonomous treatment using the autonomous mobile green area maintenance robot. The boundary can be defined by a boundary wall and/or a boundary fence. The boundary can be referred to as a boundary edge. The specific departure angle range can have a frequency distribution, which can be used to select the angle of an allowed departure angle range. For example, an allowed departure angle range can comprise a range of from 0 to 180 degrees. In addition or alternatively, the specific departure angle range can be selected from the allowed departure angle range. In particular, the specific departure angle range can be relatively smaller than the allowed relatively larger departure angle range. The specific departure angle range can advantageously comprise in each case the angle and its angle reflected at a perpendicular with respect to the boundary. The specific rotation angle range can have a frequency distribution, which can be used to select the rotation angle of an allowed rotation angle range. For example, an allowed rotation angle range can comprise a range of from −180 to 0 and of from 0 to 180 degrees. In addition or alternatively, the specific rotation angle range can be selected from the allowed rotation angle range. In particular, the specific rotation angle range can be relatively smaller than the allowed relatively larger rotation angle range. The specific rotation angle range can advantageously comprise in each case the rotation angle and its rotation angle reflected at its original or incident direction of movement. In other words: the specific rotation angle range can comprise in each case the rotation angle proceeding from the original direction of movement in a rotation direction and the rotation angle proceeding from the original direction of movement in an opposite rotation direction.

In one configuration of the invention, the specific departure angle range has an angular width of at maximum 120 degrees, in particular of at maximum 60 degrees, in particular of at maximum 20 degrees, in particular of at maximum 10 degrees. The angular width can advantageously comprise the angle and its angle reflected at the perpendicular with respect to the boundary. In particular, the angular width can comprise or be a continuous angular width on the one side of the perpendicular and a continuous angular width reflected on the other side of the perpendicular. In addition or alternatively, the specific rotation angle range is in a value range of from 10 degrees to 120 degrees, in particular in the value range of from 30 degrees to 100 degrees, in particular in the value range of from 40 degrees to 90 degrees. The value range can comprise the rotation angle and its rotation angle reflected at the original direction of movement.

In one development of the invention, step b) comprises: simulating a sequence of controlled movements of the autonomous mobile green area maintenance robot on the area to be treated having the specific shape and the specific size respectively as a function of different control parameter ranges; determining and/or identifying a period of time, in which a large part of the area to be treated has been covered by the green area maintenance robot, respectively for the different control parameter ranges; and selecting one of the different control parameter ranges having the shortest period of time as the specific control parameter range. This makes it possible to determine a specific control parameter range that is particularly suitable for the specific area. The simulation, the determination and/or the selection can advantageously be carried out using a computing unit. The simulation can then be referred to as computer simulation. This can keep outlay for the manufacturer, the specialist dealer and/or the customer low and/or at the same time represent a positive experience for the customer. Different control parameter ranges can mean that the different control parameter ranges can in each case comprise at least partly, in particular completely, control parameters that are different from one another or a relatively smaller range can be different from a relatively larger range comprising same. The green area maintenance robot can advantageously have a maintenance tool for treating the area to be treated. The maintenance tool can define a treatment width, wherein the treatment width can determine and/or influence the area covered by the green area maintenance robot. A large part of the area to be treated can mean 90 percent (%) of the area, in particular 95%, advantageously 100%. The sequence of controlled movements of the green area maintenance robot can be simulated with a constant movement speed of the green area maintenance robot. The movement speed can determine and/or influence the period of time.

In one development of the invention, the method comprises the step: c) transferring, in particular automatically and/or wirelessly transferring, the determined specific control parameter range to the autonomous mobile green area maintenance robot. Step c) can advantageously be carried out temporally after step b).

Furthermore, the invention relates to a method for operating the autonomous mobile green area maintenance robot on the area to be treated having the specific shape and the specific size. The method according to the invention comprises the steps: determining the specific control parameter range of the autonomous mobile green area maintenance robot according to the method described above; and d) controlling, in particular automatically controlling, the movement of the green area maintenance robot on the area to be treated having the specific shape and the specific size as a function of the determined specific control parameter range.

The method makes it possible to autonomously treat the area to be treated in an improved manner, in particular in a more efficient and/or more effective manner, using the autonomous mobile green area maintenance robot.

Autonomous treatment can mean that the autonomous mobile green area maintenance robot can be configured to move and/or to act on the area to be treated and/or in its environment in an independent, automatic, self-determined, self-controlled manner and/or independently of the user and/or to select at least one parameter, such as, in particular, a path parameter, and/or a turning point. Autonomous treatment can additionally or alternatively mean that the green area maintenance robot can be configured to begin with a treatment and/or to end the treatment independently. The green area maintenance robot does not need to be controlled by the user, in particular does not need to be controlled remotely. In other words: the green area maintenance robot can treat the area, in particular, without human control and/or guidance. The autonomous mobile green area maintenance robot can be referred to as a service robot.

The green area maintenance robot can advantageously be configured to control its movement on the area to be treated in such a way that the green area maintenance robot can remain on the area to be treated, in particular within the boundary, if present. The control can accordingly take place in such a way that the green area maintenance robot can remain on the area to be treated, in particular within the boundary, if present.

Step d) can advantageously be carried out temporally after step b) and/or step c), if present.

The invention furthermore relates to a system, in particular for carrying out the method described above. The system according to the invention comprises an input device and a computing unit. The input device is configured to predefine the specific shape and the specific size of the area to be treated. The computing unit is configured to cooperate with the input device and to determine the specific control parameter range of the autonomous mobile green area maintenance robot as a function of the predefined specific shape and the predefined specific size of the area to be treated.

The system makes it possible to determine the specific control parameter range for the area to be treated having the specific shape and the specific size. The input device can have a keyboard, a mouse and/or a touchscreen. The input device and/or the computing unit can advantageously be configured to establish a data connection with a map service, in particular an internet-based map service. In particular, the system can have a computer, a smartphone and/or a tablet, wherein the computer, the smartphone and/or the tablet can comprise the input device and/or the computing unit. In addition, the system can have an output device, wherein the output device can be configured to cooperate with the computing unit and to output the determined specific control parameter range. The output device can have a screen and/or a loudspeaker.

In one development of the invention, the system comprises the autonomous mobile green area maintenance robot. The green area maintenance robot is configured to control its movement on the area to be treated having the specific shape and the specific size as a function of the specific control parameter range.

The system makes it possible to autonomously treat the area to be treated in an improved manner, in particular in a more efficient and/or more effective manner, using the autonomous mobile green area maintenance robot.

The green area maintenance robot can advantageously have a maintenance tool for treating the area to be treated. The green area maintenance robot can comprise the input device, the computing unit and/or the output device, if present.

In one configuration of the invention, the system has a computing unit interface. The autonomous mobile green area maintenance robot has a robot interface. The computing unit interface and the robot interface are configured to transfer the determined specific control parameter range from the computing unit to the green area maintenance robot. The computing unit can advantageously be configured in a manner isolated and/or separate from the green area maintenance robot. The computing unit interface can correspond to the output device, if present. The robot interface can have a keyboard, a mouse and/or a touchscreen. In particular, the computing unit interface and the robot interface can be configured for automatic and/or wireless transfer. The transfer can be prompted and/or triggered by the manufacturer, the specialist dealer and/or the user.

In one configuration of the invention, the computing unit is configured to determine the specific departure angle range and/or the specific rotation angle range of the autonomous mobile green area maintenance robot as a function of the predefined specific shape and the predefined specific size of the area to be treated. The green area maintenance robot has an angle determination device. The angle determination device is configured to determine and/or detect an angle between a direction of the movement of the green area maintenance robot on the area to be treated and the boundary of the area such that the green area maintenance robot can control its movement on the area away from the boundary at the angle of the specific departure angle range. In addition or alternatively, the green area maintenance robot has a rotation angle determination device. The rotation angle determination device is configured to determine a rotation angle of a rotation of the direction of movement of the green area maintenance robot on the area to be treated on the boundary of the area such that the green area maintenance robot can control its rotation of its direction of movement on the area on the boundary by a rotation angle of the specific rotation angle range.

In one configuration of the invention, the angle determination device has a magnetic field sensor array. The magnetic field sensor array is configured to detect a magnetic field of a boundary wire of the area to be treated. The autonomous mobile green area maintenance robot is configured to determine the angle using the magnetic field sensor array. In particular, the boundary wire can enclose the area to be treated and/or define the boundary, wherein an electric current can flow through the boundary wire, wherein the electric current can generate a distance-dependent magnetic field in the area. The magnetic field sensor array is configured to detect the magnetic field and can thus be configured to detect the boundary wire, in particular within a maximum distance from the boundary wire.

In one configuration of the invention, the rotation angle determination device includes an odometry device and/or an inertia device. The autonomous mobile green area maintenance robot is configured to determine the rotation angle using the odometry device and/or the inertia device. In particular, the green area maintenance robot can have wheels, which can be driven, and the odometry device can be configured to cooperate with the wheels and/or a control unit of the wheels. The inertia device can have at least one acceleration and/or rate of rotation sensor. In addition or alternatively, the rotation angle determination device can have a magnetic field sensor array, as described above. The autonomous mobile green area maintenance robot can be configured to determine the rotation angle using the magnetic field sensor array.

In one configuration of the invention, the autonomous mobile green area maintenance robot is configured as a lawn mower robot including a lawn mower tool. In particular, the green area maintenance robot can be configured as a mulch mower robot. The lawn mower tool can advantageously comprise at least one mowing line, at least one plastic knife, at least one metallic knife and/or a metallic cutting blade having at least one cutting edge and/or having at least one cutting tooth. This can make it possible to cut grass, herbaceous plants, woody undergrowth or relatively small trees/shrubs using the lawn mower tool. The lawn mower tool can advantageously be configured as a rotating lawn mower tool and for the purpose of cutting the material to be mown by what is referred to as the free cutting method without a counter blade, in particular to produce a cutting operation by the centrifugal force of the lawn mower tool. The lawn mower tool can define the treatment width and/or a mowing width.

The invention further relates to the autonomous mobile green area maintenance robot. The autonomous mobile green area maintenance robot according to the invention comprises the robot interface and the angle determination device and/or the rotation angle determination device. The robot interface is configured to transfer the, in particular determined, specific departure angle range and/or the, in particular determined, specific rotation angle range to the green area maintenance robot. The angle determination device is configured to determine the angle between the direction of the movement of the green area maintenance robot on the area to be treated having the specific shape and the specific size and the boundary of the area. The green area maintenance robot is configured to control its movement on the area away from the boundary at the angle of the specific departure angle range. The rotation angle determination device is configured to determine the rotation angle of the rotation of the direction of movement of the green area maintenance robot on the area to be treated on the boundary of the area. In addition or alternatively, the green area maintenance robot is configured to control its rotation of its direction of movement on the area on the boundary by the rotation angle of the specific rotation angle range.

The autonomous mobile green area maintenance robot makes it possible to autonomously treat the area to be treated in an improved manner, in particular in a more efficient and/or more effective manner.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a flowchart of an exemplary method according to the invention.

FIG. 2 shows a front view of an exemplary system according to the invention.

FIG. 3 shows a side view of an autonomous mobile green area maintenance robot according to an embodiment of the invention.

FIG. 4 shows a bottom view of the green area maintenance robot of FIG. 3.

FIG. 5 shows a top view of an area to be treated having a specific shape and a specific size using the green area maintenance robot of FIG. 3.

FIG. 6 shows a further top view of the area to be treated of FIG. 5.

FIG. 7 shows a top view of another area to be treated having another specific shape and another specific size.

DETAILED DESCRIPTION OF THE DRAWINGS

FIGS. 2 to 4 show a system 10 an input device 20 in the form of a touchscreen and a computing unit 30 in the form of a microchip. The input device 20 is configured to predefine a specific shape and a specific size A, A' of an area 100, 100' to be treated. FIGS. 5 and 6 show an area 100 in the form of a meadow with grass having a specific U shape and a specific size A. FIG. 7 shows another area 100' having another specific S shape and another specific size A'. The computing unit 30 is configured to cooperate with the input device 20 and to determine a specific control parameter range SPB of an autonomous mobile green area maintenance robot 40 shown in FIGS. 3 and 4 as a function of the predefined specific shape and the predefined specific size A of the area 100.

The system 10 thus makes it possible to determine the specific control parameter range SPB for the area 100 having the specific shape and the specific size A.

In the exemplary embodiment shown, the system 10 has a smartphone, wherein the smartphone comprises the input device 20 and the computing unit 30, as can be seen in FIG. 2. The smartphone is configured to establish a data connection with an Internet-based map service. The input device 20 is configured to predetermine a user address. The smartphone is configured to automatically determine the specific shape and the specific size A of the area 100 as a function of the user address using the map service. Additionally, the system 10 has an output device in the form of the touchscreen. The output device is configured to cooperate with the computing unit 30 and to output or to display the determined specific control parameter range SPB. Furthermore, the output device is configured to output the specific shape and the specific size A of the area 100 determined as a function of the user address, as can be seen in FIG. 2.

The autonomous mobile green area maintenance robot 40 shown in FIGS. 3 and 4 is part of the system 10. The green area maintenance robot 40 is configured to automatically control its movement, in particular its direction of movement, on the area 100 having the specific shape and the specific size A as a function of the specific control parameter range SPB. In detail, the green area maintenance robot 40 has a control unit 44. The specific control parameter range SPB is stored in the control unit 44. The control unit 44 is configured to control the movement of the green area maintenance robot 40 on the area 100 as a function of the specific parameter range SPB, in particular in such a way that the green area maintenance robot 40 remains within a boundary 101 of the area 100.

The system 10 or the autonomous mobile green area maintenance robot 40 thus makes it possible to autonomously treat the area 100, in particular to specifically treat the area 100 in a manner adapted thereto, in an improved manner, in particular in a more efficient and/or more effective manner.

FIG. 1 shows an exemplary method according to the invention for determining the specific control parameter range SPB of the autonomous mobile green area maintenance robot 40 for the area 100 to be treated having the specific shape and the specific size A, in particular using the system 10 described above. The method comprises the steps: a) predefining the specific shape and the specific size A of the area 100; b) determining, in particular automatically determining, the specific control parameter range SPB as a function of the predefined specific shape and the predefined specific size A of the area 100. In the exemplary embodiment shown, the predefinition in step a) takes place completely automatically. In step a), the specific shape and the specific size A of the area 100 is automatically determined as a function of the predefined user address using the Internet-based map service and predefined for step b).

The method thus makes it possible to determine the specific control parameter range SPB for the area 100 having the specific shape and the specific size A.

In detail, the autonomous mobile green area maintenance robot 40 is configured as a lawn mower robot including a lawn mower tool 43, in particular as a mulch mower robot. The lawn mower tool 43 comprises a metallic cutting blade having three cutting teeth. In alternative exemplary embodiments, the lawn mower tool can comprise just one single cutting tooth, two or more than three cutting teeth. The lawn mower tool 43 is configured as a rotating lawn mower tool and for the purpose of mowing the area 100 using the free cutting method, in particular to produce a cutting operation by the centrifugal force of the lawn mower tool 43. The lawn mower tool 43 defines a treatment width 45 of the green area maintenance robot 40, as can be seen in FIG. 4.

Furthermore, the green area maintenance robot 40 has front wheels 46, which are pivotable, and rear wheels 47, which are driven separately from one another. The green area maintenance robot 40 can thus move on the area 100 independently, in particular with a constant movement speed, and steer. Moreover, the green area maintenance robot 40 has an electric motor (not illustrated) for driving the lawn mower tool 43. In alternative exemplary embodiments, the green area maintenance robot 40 can have an internal combustion engine, in particular a gasoline engine, for driving the lawn mower tool 43. The green area maintenance robot 40 further has a rechargeable battery (not illustrated) for supplying drive energy to the rear wheels 47 and to the electric motor for driving the lawn mower tool 43. In alternative exemplary embodiments, the green area maintenance robot can have a fuel cell, a fuel tank or another kind of drive energy source for supplying drive energy.

The system 10 also has a base station 60 for the green area maintenance robot 40, which is arranged here on the boundary 101, as can be seen at the bottom left of each of FIGS.

5 and 6. In the exemplary embodiment shown, the base station 60 is configured as a charging station for recharging, in particular automatically, the rechargeable battery of the green area maintenance robot 40.

In the exemplary embodiment shown, the specific control parameter range SPB has a specific departure angle range SWB, as can be seen in FIG. 5. The area 100 is enclosed by the boundary 101. The green area maintenance robot 40 has an angle determination device 42. The angle determination device 42 is configured to determine an angle between the direction of the movement of the green area maintenance robot 40 on the area 100 and the boundary 101. The control unit 44 is configured to cooperate with the angle determination device 42, as indicated in FIG. 3 by the dashed line, and to control the movement of the green area maintenance robot 40 away from the boundary 101 at an angle α of the specific departure angle range SWB. The computing unit 30 is configured to determine the specific departure angle range SWB of the green area maintenance robot 40 as a function of the predefined specific shape and the predefined specific size A of the area 100.

In detail, the system 10 has a boundary wire and a current source (not illustrated). The boundary wire encloses the area 100 and defines the boundary 101. The current source is configured to allow an electric current I to flow through the boundary wire, wherein the electric current I generates a distance-dependent magnetic field B in the area 100, as can be seen in FIG. 5.

The angle determination device 42 has a magnetic field sensor array in the form of two spatially isolated magnetic field sensors. The magnetic field sensor array is configured to detect the magnetic field B of the boundary wire and thus to detect the boundary wire, in particular spaced apart within a maximum distance, for example, of 1 meter from the boundary wire or the boundary 101. The green area maintenance robot 40 or its angle determination device 42 is configured to determine the angle α using the magnetic field sensor array.

Step b) of the method accordingly comprises: determining the specific departure angle range SWB as a function of the predefined specific shape and the predefined specific size A of the area 100.

In the exemplary embodiment shown, step b) comprises: selecting the specific control parameter range SPB or its specific departure angle range SWB from an allowed control parameter range or an allowed departure angle range. The allowed departure angle range comprises a range of from 0 to 180 degrees. The specific departure angle range SWB has an angular width of 20 degrees including reflection. In detail, the specific departure angle range SWB comprises a continuous angular width of 50 degrees plus/minus 5 degrees on one side of a perpendicular 103 with respect to the boundary 101 and correspondingly a continuous angular width of 130 degrees plus/minus 5 degrees reflected on another side of the perpendicular 103. The specific departure angle range SWB is thus relatively smaller than the allowed relatively larger departure angle range. The angle α is selected from the specific departure angle range SWB using a random algorithm.

The specific control parameter range SPB or its specific departure angle range SWB is determined as follows: step b) comprises: simulating a sequence of controlled movements of the green area maintenance robot 40 on the area 100 having the specific shape and the specific size A respectively as a function of different control parameter ranges. In the exemplary embodiment shown, the different departure angle ranges of 50 degrees plus/minus 5 degrees including reflection, as can be seen in FIG. 5, and β equal to 80 degrees plus/minus 5 degrees including reflection and γ equal to 10 degrees plus/minus 5 degrees including reflection are, inter alia, simulated, as can be seen in FIG. 6. Furthermore, step b) comprises: determining a period of time T, in which a large part of the area 100 has been covered by the green area maintenance robot 40, respectively for the different control parameter ranges. Moreover, step b) comprises: selecting one of the different control parameter ranges having the shortest period of time T as the specific control parameter range SPB. In the present case, the period of time T is shortest for the specific control parameter range SPB or its specific departure angle range SWB of 50 degrees plus/minus 5 degrees. The simulation, the determination and the selection are carried out using the computing unit 30. The specific control parameter range SPB and its specific departure angle range SWB and the period of time T are subsequently output using the output device, as can be seen in FIG. 2.

In the exemplary embodiment shown, in addition to the specific departure angle range SWB, the specific control parameter range SPB has a specific rotation angle range DWB, as can be seen in FIG. 5. In alternative exemplary embodiments, it may be sufficient when the specific control parameter range has either the specific departure angle range or the specific rotation angle range.

The green area maintenance robot 40 has a rotation angle determination device 48. In alternative exemplary embodiments, it may be sufficient when the green area maintenance robot has either the angle determination device or the rotation angle determination device. The rotation angle determination device 48 is configured to determine a rotation angle of a rotation of the direction of movement of the green area maintenance robot 40 on the area 100 on the boundary 101. The control unit 44 is configured to cooperate with the rotation angle determination device 48, as indicated in FIG. 3 by the dashed line, and to control the rotation of the direction of movement of the green area maintenance robot 40 on the boundary 101 at a rotation angle c of the specific rotation angle range DWB.

The computing unit 30 is configured to determine the specific rotation angle range DWB of the green area maintenance robot 40 as a function of the predefined specific shape and the predefined specific size A of the area 100. In alternative exemplary embodiments, it may be sufficient when the computing unit is configured to determine the specific departure angle range or specific rotation angle range.

The rotation angle determination device 48 has an odometry device. The green area maintenance robot 40 or its rotation angle determination device 48 is configured to determine the rotation angle c using the odometry device. In detail, the rotation angle determination device 48 or its odometry device is configured to cooperate with the wheels 46, 47, in particular with the rear wheels 47, as indicated in FIGS. 3 and 4 by dashed lines. In alternative exemplary embodiments, the rotation angle determination device additionally or alternatively can have an inertia device and/or a magnetic field sensor array.

Step b) of the method accordingly comprises: determining the specific rotation angle range DWB as a function of the predefined specific shape and the predefined specific size A of the area 100. In detail, the specific rotation angle range can be determined like the specific departure angle range, as described above.

In the exemplary embodiment shown, the specific rotation angle range is in a value range of from 30 degrees to 100 degrees. The value range comprises the rotation angle ε. In detail, the rotation angle between the original direction of movement PI and a rotated direction of movement PO is 90 degrees in the exemplary embodiment shown. In addition, the value range comprises the rotation angle (not illustrated) that is reflected at the original direction of movement PI. The rotation angle c or its reflected rotation angle is selected from the specific rotation angle range DWB using a random algorithm.

The system 10 also has a computing unit interface 50 in the form of an antenna. The green area maintenance robot 40 has a robot interface 41 in the form of an antenna. The computing unit interface 50 and the robot interface 41 are configured to cooperate with one another and to automatically and wirelessly transfer the determined specific control parameter range SPB from the computing unit 30 to the green area maintenance robot 40. The transfer can be triggered by the transfer button 51 on the input/output device 20 in the form of the touchscreen. The robot interface 41 and the control unit 44 are configured to cooperate with one another.

The method accordingly has step c): transferring, in particular automatically and wirelessly transferring, the determined specific control parameter range SPB to the green area maintenance robot 40.

A method according to the invention for operating the green area maintenance robot 40 on the area 100 having the specific shape and the specific size A comprises the method described above for determining the specific control parameter range SPB. The method also has step d): controlling, in particular automatically controlling, the movement of the green area maintenance robot 40 on the area 100 having the specific shape and the specific size A as a function of the determined specific control parameter range SPB or its determined specific departure angle range SWB and/or its determined specific rotation angle range DWB. In addition, the controlling takes place in such a way that the green area maintenance robot 40 remains within the boundary 101 of the area 100.

In detail, the green area maintenance robot 40 can detect the boundary 101 in the form of the boundary wire, if present, using the angle determination device 42 in the form of the magnetic field sensor array, if present, and thus remain within the boundary 101.

In addition or alternatively, the green area maintenance robot can have a boundary detection device, which is configured to detect the boundary. For example, the boundary detection device can have an, in particular just one single, magnetic field sensor. To this end, the green area maintenance robot can detect the boundary in the form of the boundary wire, if present, using the boundary detection device in the form of the magnetic field sensor, and thus remain within the boundary: the green area maintenance robot can rotate by the rotation angle of the specific rotation angle range on the boundary using the rotation angle determination device. If the rotation angle is insufficient to remain within the boundary, it can rotate again by the or another rotation angle of the specific rotation angle range.

The method thus makes it possible to autonomously treat the area 100 using the green area maintenance robot 40 in an improved manner.

As the exemplary embodiments shown and explained above make clear, the invention provides an advantageous method for determining a specific control parameter range of an autonomous mobile green area maintenance robot for an area to be treated having a specific shape and a specific size, which method makes it possible to autonomously treat the area using the green area maintenance robot in an improved manner, and a method for operating the green area maintenance robot on the area, a system, in particular for carrying out the method, and the green area maintenance robot.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a specific control parameter range of an autonomous mobile green area maintenance robot for an area to be treated having a specific shape and a specific size, wherein the autonomous mobile green area maintenance robot is configured to control its movement on the area to be treated as a function of the specific control parameter range,
   the method comprising the steps of:
   a) predefining the specific shape and the specific size of the area to be treated, and
   b) determining the specific control parameter range as a function of the predefined specific shape and the predefined specific size of the area to be treated,
   wherein the specific control parameter range includes a specific departure angle range and/or a specific rotation angle range,
   wherein the area to be treated having the specific shape and the specific size is enclosed by a boundary, and
   wherein the autonomous mobile green area maintenance robot is configured to control its movement away from the boundary at an angle of the specific departure angle range and/or a rotation of its direction of movement on the boundary at a rotation angle of the specific rotation angle range,
   wherein step b) comprises:
   determining the specific departure angle range and/or the specific rotation angle range as a function of the predefined specific shape and the predefined specific size of the area to be treated.

2. The method according to claim 1,
   wherein step b) comprises:
   selecting the specific control parameter range from an allowed control parameter range.

3. The method according to claim 1,
   wherein the specific departure angle range has an angular width of at maximum 120 degrees, and/or
   wherein the specific rotation angle range has a value in the range from 10 degrees to 120 degrees.

4. The method according to claim 1,
   wherein step b) comprises:
   simulating a sequence of controlled movements of the autonomous mobile green area maintenance robot on the area to be treated having the specific shape and the specific size respectively as a function of different control parameter ranges,
   determining a period of time, in which a large part of the area to be treated has been covered by the green area maintenance robot, respectively for the different control parameter ranges, and
   selecting one of the different control parameter ranges having the shortest period of time as the specific control parameter range.

5. The method according to claim 1, further comprising the step of:

c) transferring the determined specific control parameter range to the autonomous mobile green area maintenance robot.

6. A method for operating an autonomous mobile green area maintenance robot on an area to be treated having a specific shape and a specific size, the method comprising the steps of:
   determining a specific control parameter range of the autonomous mobile green area maintenance robot by:
   a) predefining the specific shape and the specific size of the area to be treated,
   b) determining the specific control parameter range as a function of the predefined specific shape and the predefined specific size of the area to be treated,
   controlling the movement of the green area maintenance robot on the area to be treated having the specific shape and the specific size, as a function of the determined specific control parameter range,
      wherein the specific control parameter range includes a specific departure angle range and/or a specific rotation angle range,
      wherein the area to be treated having the specific shape and the specific size is enclosed by a boundary, and
      wherein the autonomous mobile green area maintenance robot is configured to control its movement away from the boundary at an angle of the specific departure angle range and/or a rotation of its direction of movement on the boundary at a rotation angle of the specific rotation angle range,
   wherein step b) comprises:
      determining the specific departure angle range and/or the specific rotation angle range as a function of the predefined specific shape and predefined specific size of the area to be treated.

7. A system, comprising:
   an autonomous mobile green area maintenance robot,
   an input device, and
   a computing unit,
   wherein the input device is configured to predefine a specific shape and a specific size of an area to be treated,
   wherein the computing unit is configured to cooperate with the input device and to determine a specific control parameter range of the autonomous mobile green area maintenance robot as a function of the predefined specific shape and the predefined specific size of the area to be treated,
   wherein the green area maintenance robot is configured to control its movement on the area to be treated having the specific shape and the specific size as a function of the specific control parameter range,
   wherein the computing unit is configured to determine a specific departure angle range and/or a specific rotation angle range of the autonomous mobile green area maintenance robot as a function of the predefined specific shape and the predefined specific size of the area to be treated, and
   wherein the green area maintenance robot has an angle determination device, wherein the angle determination device is configured to determine an angle between a direction of movement of the green area maintenance robot on the area to be treated and a boundary of the area such that the green area maintenance robot controls its movement on the area away from the boundary at an angle of the specific departure angle range, and/or
   wherein the green area maintenance robot has a rotation angle determination device, wherein the rotation angle determination device is configured to determine a rotation angle of a rotation of the direction of movement of the green area maintenance robot on the area to be treated on the boundary of the area such that the green area maintenance robot controls a rotation of the direction of movement on the area on the boundary at a rotation angle of the specific rotation angle range.

8. The system according to claim 7,
   wherein the system includes a computing unit interface, and
   wherein the autonomous mobile green area maintenance robot has a robot interface, and
   wherein the computing unit interface and the robot interface are configured to transfer the determined specific control parameter range from the computing unit to the green area maintenance robot.

9. The system according to claim 7,
   wherein the angle determination device includes a magnetic field sensor array, wherein the magnetic field sensor array is configured to detect a magnetic field of a boundary wire of the area to be treated, and
   wherein the autonomous mobile green area maintenance robot is configured to determine the angle using the magnetic field sensor array.

10. The system according to claim 7,
    wherein the rotation angle determination device includes an odometry device and/or an inertia device, and
    wherein the autonomous mobile green area maintenance robot is configured to determine the rotation angle using the odometry device and/or the inertia device.

11. The system according to claim 7,
    wherein the autonomous mobile green area maintenance robot is a lawn mower robot including a lawn mower tool.

* * * * *